(12) United States Patent
Chen et al.

(10) Patent No.: US 11,383,923 B2
(45) Date of Patent: Jul. 12, 2022

(54) SMART AIRFLOW DISTRIBUTION SYSTEM

(71) Applicant: CARRIER CORPORATION, Palm Beach Gardens, FL (US)

(72) Inventors: Yu Chen, Manlius, NY (US); James Taeckens, Manlius, NY (US); Richard Clark, Fulton, NY (US); Fun Sin Chiou, Singapore (SG); Renze Elzinga, Singapore (SG); Terry Sau, Singapore (SG)

(73) Assignee: CARRIER CORPORATION, Palm Beach Gardens, FL (US)

( * ) Notice: Subject to any disclaimer, the term of this patent is extended or adjusted under 35 U.S.C. 154(b) by 267 days.

(21) Appl. No.: 16/778,639

(22) Filed: Jan. 31, 2020

(65) Prior Publication Data
US 2020/0247606 A1    Aug. 6, 2020

Related U.S. Application Data

(60) Provisional application No. 62/800,095, filed on Feb. 1, 2019.

(51) Int. Cl.
*F25D 17/00* (2006.01)
*B65D 88/74* (2006.01)
*F25D 17/04* (2006.01)

(52) U.S. Cl.
CPC ......... *B65D 88/745* (2013.01); *F25D 17/045* (2013.01); *B65D 2588/743* (2013.01); *F25D 2700/12* (2013.01)

(58) Field of Classification Search
CPC .... F25D 11/003; F25D 17/005; F25D 17/045; F25D 17/06; F25D 2700/12; F25D 2700/123; B65D 2588/743; B65D 88/745
See application file for complete search history.

(56) References Cited

U.S. PATENT DOCUMENTS

| 9,766,600 | B2* | 9/2017 | Clarke | F25D 11/003 |
| 9,889,724 | B2* | 2/2018 | Chen | B60H 1/3232 |
| 2012/0198866 | A1* | 8/2012 | Zeidner | F25D 17/06 62/89 |

FOREIGN PATENT DOCUMENTS

| DE | 9308132 U1 | 8/1993 |
| JP | 11201618 A | 7/1999 |
| WO | 2011050157 A2 | 4/2011 |

OTHER PUBLICATIONS

European Search Report Application No. 20153945; dated Jul. 2, 2020; pp. 6.

\* cited by examiner

*Primary Examiner* — Filip Zec
(74) *Attorney, Agent, or Firm* — Cantor Colburn LLP

(57) ABSTRACT

A shipping container is provided and includes a structural frame defining an interior, a transport refrigeration unit (TRU) and a control system. The TRU includes an inlet through which air is drawn from a lower region of the interior, a refrigeration unit configured to cool the air drawn from the lower region of the interior through the inlet and an outlet through which air cooled by the refrigeration unit is exhausted toward an upper region of the interior. The control system is configured to control an exhaustion of the air cooled by the refrigeration unit toward the upper region of the interior to maintain a predefined environmental condition within the interior.

20 Claims, 2 Drawing Sheets

SMART AIRFLOW DISTRIBUTION SYSTEM

CROSS-REFERENCE TO RELATED APPLICATION

This application claims the benefit of U.S. Application No. 62/800,095 filed Feb. 1, 2019, which is incorporated herein by reference in its entirety.

BACKGROUND

The following description relates to shipping containers and, more particularly, to shipping container with an integrated transport refrigeration unit (TRU) and a smart airflow distribution system.

Refrigerated shipping containers with TRUs integrated with their structural frame have been developed. Such shipping containers can have a box-like structure that defines a cargo space in which bins, cartons or pallets of cargo being transported are stacked on a floor. Rear walls can have doors that provide access to the cargo space when opened but form an air-tight sealed cargo space when closed. The front walls have integrated TRUs that are configured to condition the cargo space during shipping.

In a typical shipping container with a TRU integrated into its front wall, cold air output from the TRU is directed toward the floor of the shipping container. The floor can be made up of a series of T-bars that are arranged side-by-side so that channels are formed between adjacent T-bars. The cold air travels through these channels along the length of the shipping container and rises through certain holes or openings to cool the cargo. This cooling results in warmed air that rises toward the roof of the shipping container and propagates toward the front wall where it is ingested back into the TRU.

In certain cases, the flow of cooling air from the floor in a shipping container with a TRU integrated into its front wall can be negatively affected by cargo packaging. That is, the flow of cooling air can be blocked by cargo and as a result may not circulate correctly. This can lead to cargo suffering heat damage in local areas. The flow of cooling air can also be negatively affected by leakage caused by damaged door seals, for example, that gives rise to localized hot spots.

BRIEF DESCRIPTION

According to an aspect of the disclosure, a shipping container is provided and includes a structural frame defining an interior, a transport refrigeration unit (TRU) and a control system. The TRU includes an inlet through which air is drawn from a lower region of the interior, a refrigeration unit configured to cool the air drawn from the lower region of the interior through the inlet and an outlet through which air cooled by the refrigeration unit is exhausted toward an upper region of the interior. The control system is configured to control an exhaustion of the air cooled by the refrigeration unit toward the upper region of the interior to maintain a predefined environmental condition within the interior.

In accordance with additional or alternative embodiments, the structural frame includes a floor, a ceiling and sidewalls supporting the floor above the ceiling and the TRU is coupled to one of the sidewalls and another one of the sidewalls includes a sealed door.

In accordance with additional or alternative embodiments, the structural frame includes a floor, a ceiling and sidewalls supporting the floor above the ceiling and the TRU is integrated into one of the sidewalls and another one of the sidewalls includes a sealed door.

In accordance with additional or alternative embodiments, the inlet is disposed proximate to the floor and the outlet is disposed proximate to the ceiling.

In accordance with additional or alternative embodiments, the shipping container further includes at least one of a smart plenum and controllable ducts supportively disposed along the ceiling, wherein the outlet is fluidly communicative with the upper region of the interior by the at least one of the smart plenum and the controllable ducts.

In accordance with additional or alternative embodiments, the control system includes sensing elements deployed throughout the interior and a controller coupled to the sensing elements and the at least one of the smart plenum and the controllable ducts and configured to control operations of the at least one of the smart plenum and the controllable ducts based on at least readings of the sensing elements to maintain the predefined environmental condition within the interior.

According to another aspect of the disclosure, a shipping container is provided and includes a structural frame defining an interior, a transport refrigeration unit (TRU), a smart plenum and a control system. The TRU includes an inlet through which air is drawn from a lower region of the interior, a refrigeration unit configured to cool the air drawn from the lower region of the interior through the inlet and an outlet through which air cooled by the refrigeration unit is exhausted toward an upper region of the interior. The smart plenum is defined in the upper region of the interior and by which the outlet is fluidly communicative with the upper region of the interior. The control system is configured to control the smart plenum to maintain a predefined environmental condition within the interior.

In accordance with additional or alternative embodiments, the structural frame includes a floor, a ceiling and sidewalls supporting the floor above the ceiling and the TRU is coupled to one of the sidewalls and another one of the sidewalls includes a sealed door.

In accordance with additional or alternative embodiments, the structural frame includes a floor, a ceiling and sidewalls supporting the floor above the ceiling and the TRU is integrated into one of the sidewalls and another one of the sidewalls includes a sealed door.

In accordance with additional or alternative embodiments, the inlet is disposed proximate to the floor and the outlet is disposed proximate to the ceiling.

In accordance with additional or alternative embodiments, the smart plenum is defined along an entire span of the ceiling.

In accordance with additional or alternative embodiments, the smart plenum includes a plenum ceiling disposed in the interior below the ceiling.

In accordance with additional or alternative embodiments, the control system includes sensing elements deployed throughout the interior and a controller coupled to the smart plenum and the sensing elements and configured to control operations of the smart plenum based on at least readings of the sensing elements to maintain the predefined environmental condition within the interior.

According to yet another aspect of the disclosure, a shipping container is provided and includes a structural frame defining an interior, a transport refrigeration unit (TRU), controllable ducts and a control system. The TRU includes an inlet through which air is drawn from a lower region of the interior, a refrigeration unit configured to cool the air drawn from the lower region of the interior through the inlet and an outlet through which air cooled by the refrigeration unit is exhausted toward an upper region of the interior. The controllable ducts are supportively disposed in the upper region of the interior and by which the outlet is fluidly communicative with the upper region of the interior. The control system is configured to control the controllable ducts to maintain a predefined environmental condition within the interior.

In accordance with additional or alternative embodiments, the structural frame includes a floor, a ceiling and sidewalls supporting the floor above the ceiling and the TRU is coupled to one of the sidewalls and another one of the sidewalls includes a sealed door.

In accordance with additional or alternative embodiments, the structural frame includes a floor, a ceiling and sidewalls supporting the floor above the ceiling and the TRU is integrated into one of the sidewalls and another one of the sidewalls includes a sealed door.

In accordance with additional or alternative embodiments, the inlet is disposed proximate to the floor and the outlet is disposed proximate to the ceiling.

In accordance with additional or alternative embodiments, the controllable ducts are supportively disposed along each side of the ceiling.

In accordance with additional or alternative embodiments, each controllable duct includes a duct element and a controllable valve element to control an amount of the air cooled by the refrigeration unit that is permitted to flow through the duct element.

In accordance with additional or alternative embodiments, the control system includes sensing elements deployed throughout the interior and a controller coupled to the controllable ducts and the sensing elements and configured to control operations of the controllable ducts based on at least readings of the sensing elements to maintain the predefined environmental condition within the interior.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, a shipping container is provided with a TRU coupled to or integrated into its structural frame. The shipping container includes a smart airflow delivery system that can address and mitigate issues with cooling air flows being sensitive to cargo packaging. The smart airflow delivery provides for airflow plenums and/or ducts that can be controlled by temperature and/or flow rate sensors so that cooling air flows can be directed downwardly onto cargo. The smart airflow delivery can possibly reduce or eliminate a need for a T-bar structure in the floor of the shipping container and can mitigate effects of localized hot spots within a shipping container.

Figure 1:
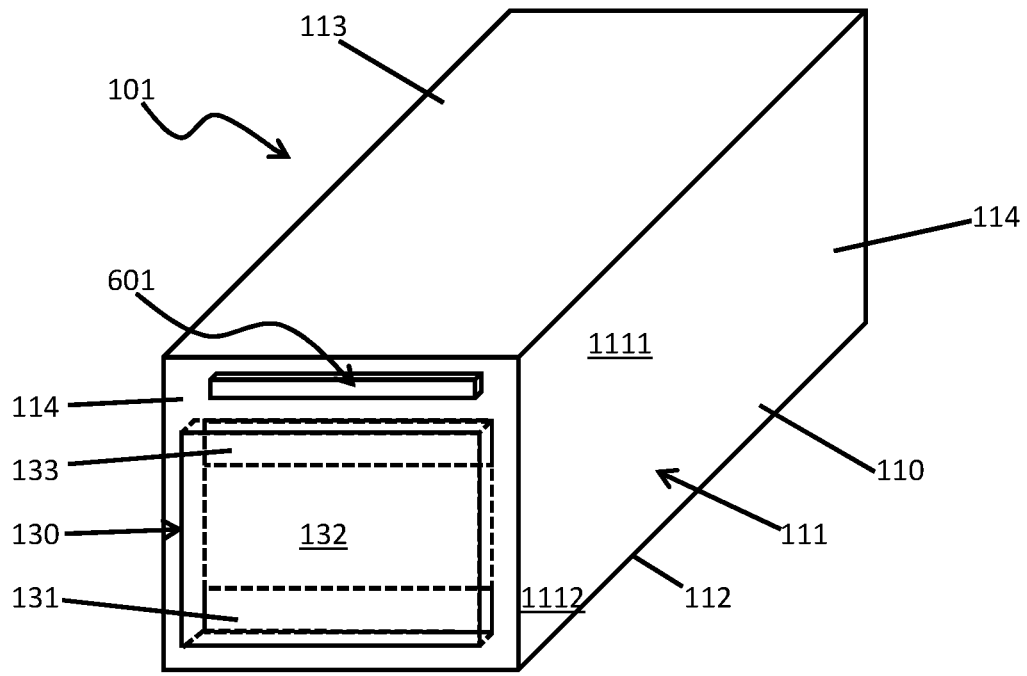
FIG. 1 is a perspective view of a shipping container with an integrated transport refrigeration unit (TRU) in accordance with embodiments.
Figure 2:
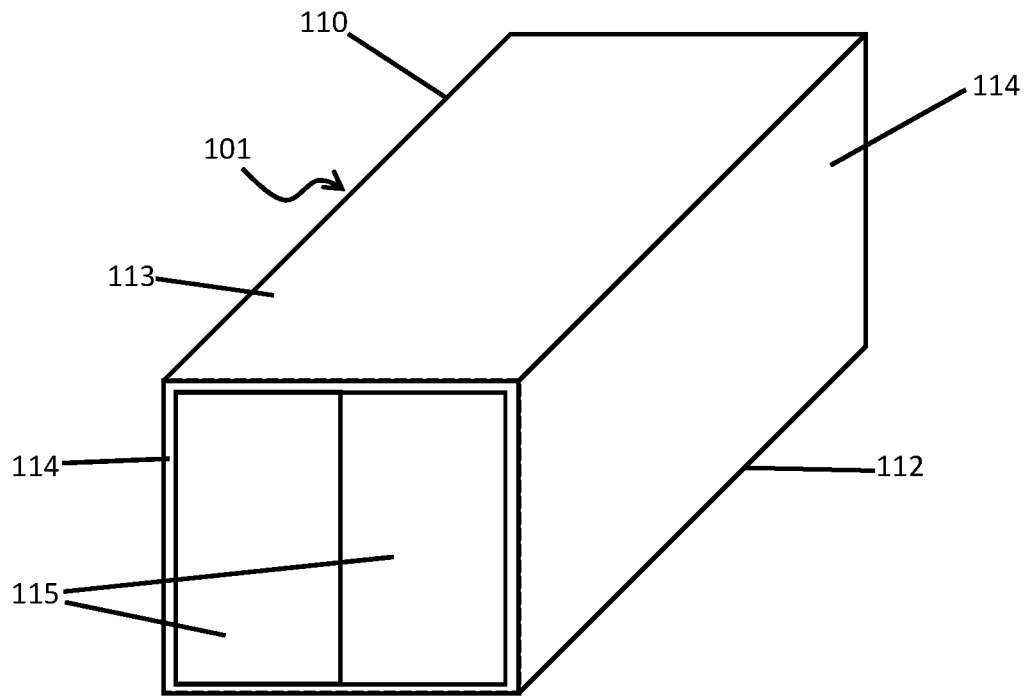
FIG. 2 is a perspective view of a door side of the shipping container of FIG. 1.

With reference to FIGS. 1 and 2, a shipping container 101 is provided. The shipping container 101 includes a structural frame 110 and a TRU 130 that is coupled to or integrated into the structural frame 110. The structural frame 110 is formed to define an interior 111 in which cargo can be stored for transport. The TRU 130 is configured to condition the interior 111 to maintain environmental conditions therein that are appropriate for the storage of the cargo.

The structural frame 110 includes a floor 112, a ceiling 113 and sidewalls 114 supporting the ceiling 113 above the floor 112. In accordance with embodiments, the structural frame 110 can have a substantially rectangular shape with an opposing pair of major sidewalls 114 and an opposing pair of minor sidewalls 114. In these or other cases, the TRU 130 is coupled to (e.g., bolted or otherwise affixed) to or integrated into one of the sidewalls 114 or, more particularly, one of the minor sidewalls 114. Sealable doors 115 that allow for access to the interior 111 can be included in another sidewall 114 or, more particularly, the other one of the minor sidewalls 114.

The TRU 130 includes an inlet 131, a refrigeration unit 132 and an outlet 133. The inlet 131 can be disposed proximate to the floor 112 and is configured such that air is drawn toward the refrigeration unit 132 through the inlet 131 from a lower region 1111 of the interior 111. The refrigeration unit 132 is configured to cool the air drawn from the lower region 1111 of the interior 111 through the inlet 131. The outlet 132 can be disposed proximate to the ceiling 113 and is configured such that air cooled by the refrigeration unit 132 can be exhausted toward an upper region 1112 of the interior 111.

During a shipment operation, the air cooled by the refrigeration unit 132 and exhausted toward the upper region 1112 of the interior 111 through the outlet 133 flows over and around cargo disposed within the interior 111 to cool the cargo and prevent heat damage. The resulting flow of warmed air travels back toward the TRU 130 along the floor 112 and returns to the refrigeration unit 132 through the inlet 131.

Figure 3:
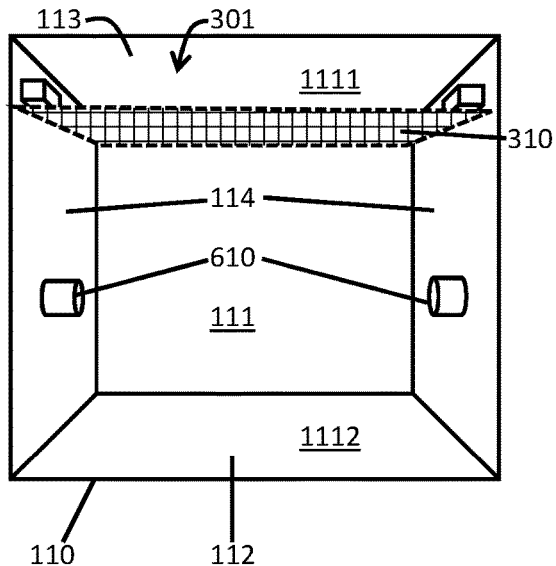
FIG. 3 is an axial view of an interior of the shipping container of FIGS. 1 and 2 and a smart plenum therein in accordance with embodiments.

With reference to FIG. 3, the shipping container 101 can further include a smart plenum 301. This smart plenum 301 may be defined in the upper region 1111 of the interior 111 and is configured such that the outlet 133 is fluidly communicative with the upper region 1111 of the interior 111 via the smart plenum 301.

In accordance with embodiments, the smart plenum 301 can be defined to extend across an entire span of the ceiling 113 and may include a plenum ceiling 310. The plenum ceiling 310 can be disposed below the ceiling 113 to thus define a space between the ceiling 113 and the plenum ceiling 310. The plenum ceiling 310 can be provided as or with an air-porous or air-permeable medium. Controllable ducts 401 (to be described below with reference to FIG. 5) can be fluidly communicative with this space and the outlet 133.

Figure 4:
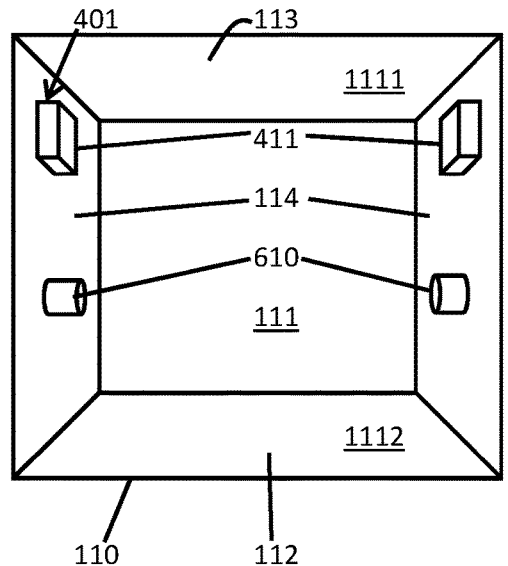
FIG. 4 is an axial view of an interior of the shipping container of FIGS. 1 and 2 and controllable ducts therein in accordance with embodiments.

With reference to FIG. 4, the shipping container 101 can further include controllable ducts 401. The controllable ducts 401 can be supportively disposed along one or both sides of the ceiling 113 and are each configured such that the outlet 133 is fluidly communicative with the upper region 1111 of the interior 111 via the controllable ducts 401.

Figure 5:
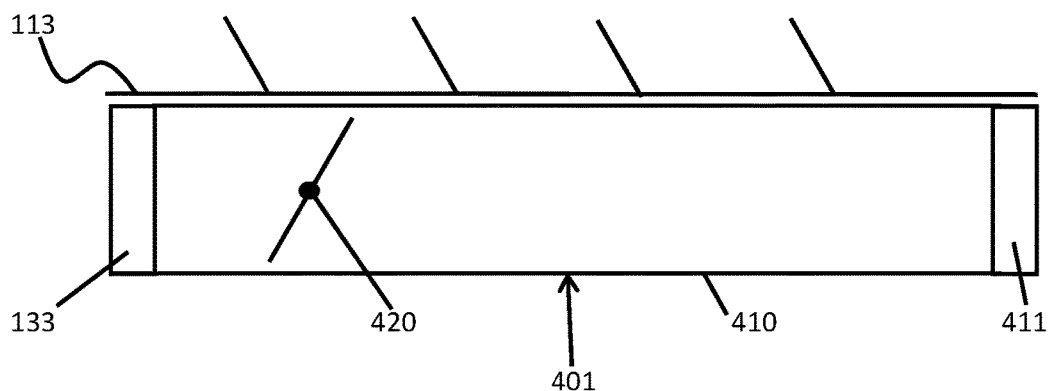
FIG. 5 is a side schematic illustration of controllable ducts for use with the smart plenum of FIG. 3 or the controllable ducts of FIG. 4.

With reference to FIG. 5 and in accordance with embodiments, the controllable ducts 401 can each include a duct element 410, which is formed to define a flow path for cooled air from the outlet 133 to the smart plenum 301 of FIG. 3 or controllable duct outlets 411 of FIG. 4, and a controllable valve element 420. The controllable valve element 420 can be provided as a valve or a damper and is configured to control an amount of cooled air that is permitted to flow through the duct element 410.

Figure 6:
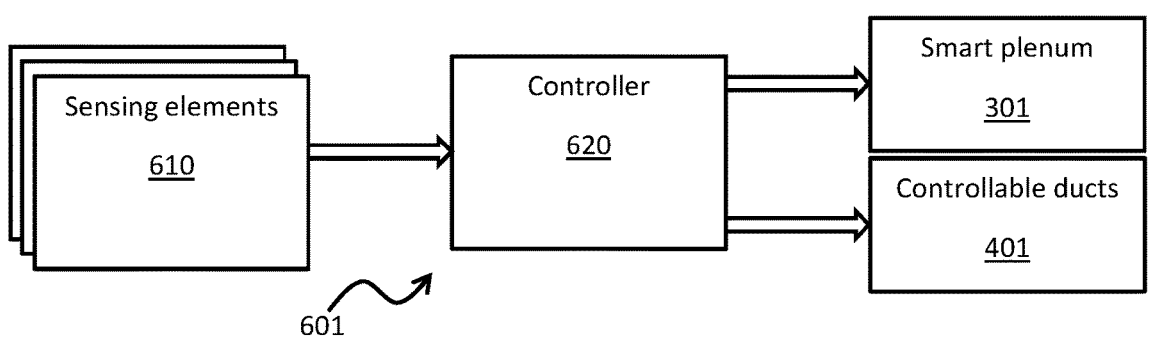
FIG. 6 is a schematic diagram of a control system of a shipping container with an integrated transport refrigeration unit (TRU) in accordance with embodiments.

With reference back to FIG. 1 and with additional reference to FIG. 6, the shipping container 101 can further include a control system 601 that is configured to control operations of the smart plenum 301 and/or the controller ducts 401 in order to maintain a predefined temperature profile within various forward, aft and central portions of the interior 111. The control system 601 includes sensing elements 610 (see FIGS. 3 and 4) and a controller 620. The sensing elements 610 can include or be provided as one or more of temperature sensors and thermal imaging devices and are deployed throughout the interior 111 to sense environmental conditions therein. The controller 620 is coupled to the smart plenum 301 and the controllable ducts 401 as well as to the sensing elements 610. The controller 620 is thus disposed and configured to control operations of the smart plenum 301 and the controllable ducts 401 based on readings of the sensing elements 610 as well as internal logic stored in the controller 620 to maintain the predefined environmental condition within the interior 111.

The controller 620 can include a processor, a memory unit, a networking unit by which the processor is communicative with the smart plenum 301, the controllable ducts 401 and the sensing elements 610 and an input/output (I/O) bus by which the processor is communicative with the memory unit and the networking unit. The memory unit has executable instructions stored thereon, which are readable and executable by the processor. The executable instructions may include the above-mentioned internal logic. As such, when the executable instructions are read and executed by the processor, the executable instructions (i.e., the internal logic) cause the processor to control operations of the smart plenum 301 and the controllable ducts 401 based on the readings of the sensing elements 610 as well as the internal logic to maintain the predefined environmental condition within the interior 111.

The control system 601 can also be used to mitigate effects of localized hot spots within the shipping container 101. In an exemplary case of the shipping container 101 having a leak caused by damaged doors seals, for example, the control system 601 can identify a presence of a hot spot within the interior 111 and direct an increased amount of cold air to that location via the smart plenum 301 and the controllable ducts 401. This cold air can maintain the predefined environmental conditions within the interior 111 even when taking into account leakage the increased need for cooling at the hot spot.

The identification of the presences of the hot spot and other environmental abnormalities can be executed by the control system 601 in real-time by way of iterative and/or periodic algorithms. As such, the control system 601 allows for distributions of cold air throughout the interior 111 to be dynamically adjusted over time to compensate for evolving or unexpected conditions or cargo loadings in order to optimize actual cargo conditions versus return and supply air temperatures.

Technical effects and benefits of the features described herein are the provision of improved cargo quality resulting from improved supply air delivery. In addition, by eliminating T-bar flows, there could be weight and cost savings in the reduced or eliminated need for a T-bar structures in shipping container floors.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A shipping container, comprising:
   a structural frame comprising a ceiling and defining an interior;
   a transport refrigeration unit (TRU) comprising an inlet through which air is drawn from a lower region of the interior and an outlet through which cooled air is exhausted toward an upper region of the interior;
   a control system configured to control an exhaustion of the air cooled by the refrigeration unit toward the upper region of the interior to maintain a predefined environmental condition within the interior; and
   a smart plenum defined in the upper region of the interior and by which the outlet is fluidly communicative with the upper region of the interior,
   wherein the smart plenum is defined along an entire span of the ceiling and comprises a plenum ceiling disposed in the interior below the ceiling and provided as a continuous air-porous or air-permeable medium along the entire span of the ceiling.

2. The shipping container according to claim 1, wherein:
   the structural frame comprises a floor, the ceiling and sidewalls supporting the floor above the ceiling, and
   the TRU is coupled to one of the sidewalls and another one of the sidewalls comprises a sealed door.

3. The shipping container according to claim 1, wherein:
   the structural frame comprises a floor, the ceiling and sidewalls supporting the floor above the ceiling, and
   the TRU is integrated into one of the sidewalls and another one of the sidewalls comprises a sealed door.

4. The shipping container according to claim 3, wherein the inlet is disposed proximate to the floor and the outlet is disposed proximate to the ceiling.

5. The shipping container according to claim 1, further comprising controllable ducts supportively disposed along the ceiling, wherein the outlet is fluidly communicative with the upper region of the interior by the smart plenum and the controllable ducts.

6. The shipping container according to claim 5, wherein the control system comprises:
sensing elements deployed throughout the interior; and
a controller coupled to the sensing elements and the smart plenum and the controllable ducts and configured to control operations of the smart plenum and the controllable ducts based on at least readings of the sensing elements to maintain the predefined environmental condition within the interior.

7. A shipping container, comprising:
a structural frame comprising a ceiling and defining an interior;
a transport refrigeration unit (TRU) comprising an inlet through which air is drawn from a lower region of the interior and an outlet through which cooled air is exhausted toward an upper region of the interior;
a smart plenum defined in the upper region of the interior and by which the outlet is fluidly communicative with the upper region of the interior; and
a control system configured to control the smart plenum to maintain a predefined environmental condition within the interior,
wherein the smart plenum is defined along an entire span of the ceiling and comprises a plenum ceiling disposed in the interior below the ceiling and provided as a continuous air-porous or air-permeable medium along the entire span of the ceiling.

8. The shipping container according to claim 7, wherein:
the structural frame comprises a floor, the ceiling and sidewalls supporting the floor above the ceiling, and
the TRU is coupled to one of the sidewalls and another one of the sidewalls comprises a sealed door.

9. The shipping container according to claim 7, wherein:
the structural frame comprises a floor, the ceiling, axial sidewalls and lateral sidewalls supporting the floor above the ceiling, and
the TRU is integrated into one of the axial sidewalls and another one of the axial sidewalls comprises a sealed door.

10. The shipping container according to claim 9, wherein the inlet is disposed proximate to the floor and the outlet is disposed proximate to the ceiling.

11. The shipping container according to claim 9, wherein the smart plenum is defined along the entire span of the ceiling between the lateral sidewalls.

12. The shipping container according to claim 11, wherein the plenum ceiling extends continuously along the entire span of the ceiling between the lateral sidewalls.

13. The shipping container according to claim 7, wherein the control system comprises:
sensing elements deployed throughout the interior; and
a controller coupled to the smart plenum and the sensing elements and configured to control operations of the smart plenum based on at least readings of the sensing elements to maintain the predefined environmental condition within the interior.

14. A shipping container, comprising:
a structural frame comprising a ceiling and defining an interior;
a transport refrigeration unit (TRU) comprising an inlet through which air is drawn from a lower region of the interior and an outlet through which cooled air is exhausted toward an upper region of the interior;
controllable ducts supportively disposed in the upper region of the interior and by which the outlet is fluidly communicative with the upper region of the interior; and
a control system configured to control the controllable ducts to maintain a predefined environmental condition within the interior,
wherein the smart plenum is defined along an entire span of the ceiling and comprises a plenum ceiling disposed in the interior below the ceiling and provided as a continuous air-porous or air-permeable medium along the entire span of the ceiling.

15. The shipping container according to claim 14, wherein:
the structural frame comprises a floor, the ceiling and sidewalls supporting the floor above the ceiling, and
the TRU is coupled to one of the sidewalls and another one of the sidewalls comprises a sealed door.

16. The shipping container according to claim 14, wherein:
the structural frame comprises a floor, the ceiling and sidewalls supporting the floor above the ceiling, and
the TRU is integrated into one of the sidewalls and another one of the sidewalls comprises a sealed door.

17. The shipping container according to claim 16, wherein the inlet is disposed proximate to the floor and the outlet is disposed proximate to the ceiling.

18. The shipping container according to claim 16, wherein the controllable ducts are supportively disposed along each side of the ceiling.

19. The shipping container according to claim 14, wherein each controllable duct comprises:
a duct element; and
a controllable valve element to control an amount of the air cooled by the refrigeration unit that is permitted to flow through the duct element.

20. The shipping container according to claim 14, wherein the control system comprises:
sensing elements deployed throughout the interior; and
a controller coupled to the controllable ducts and the sensing elements and configured to control operations of the controllable ducts based on at least readings of the sensing elements to maintain the predefined environmental condition within the interior.

* * * * *